Patented Mar. 25, 1947

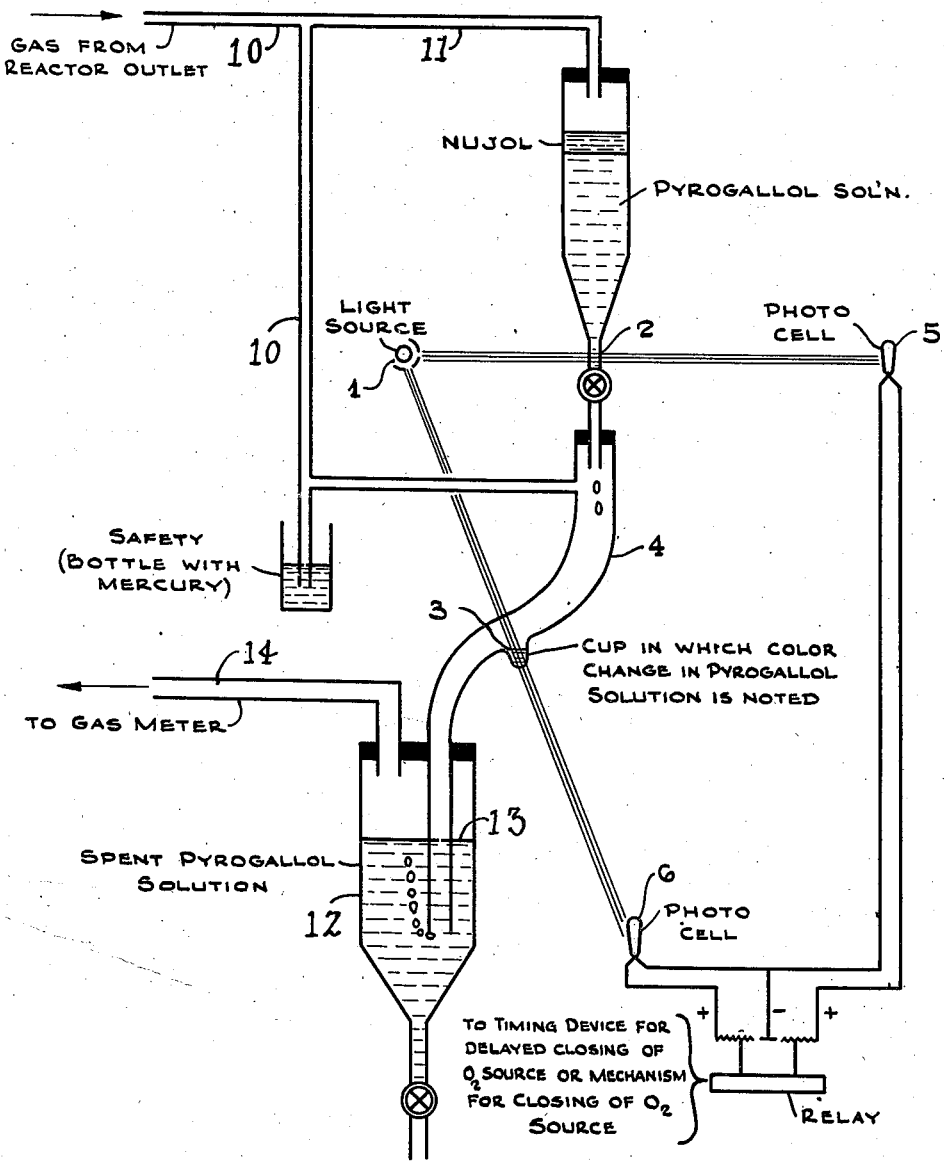

2,417,877

UNITED STATES PATENT OFFICE 2,417,877

AUTOMATIC OXYGEN INDICATOR

Elton R. Lewis, Roselle Park, N. J., assignor to Standard Oil Development Company, a corporation of Delaware Application January 4, 1944, Serial No. 516,992

1 Claim. (Cl. 23—255)

This invention relates to automatic means of sensing the radiant energy transmission of materials subject to change, and in particular to a simple and quick responding means for regulating and controlling many chemical processes and operations by reason of differences in the optical character of reaction systems or products thereof.

In many chemical processes it is advantageous to have available automatic sensing or control devices and to have devices which indicate the likelihood of hazardous conditions. In the past many alarm systems have been based upon the detection of small quantities of hazardous materials in reaction systems. Also in many petroleum refining operations where catalysts are used, it is necessary to have available means for detecting the end of certain operations and to prevent the occurrence of subsequent disadvantageous reactions. Thus in the regeneration of catalyst materials, it is essential that very careful control be maintained upon the regeneration operation to prevent substantial depreciation of the catalyst. Inactive catalysts, due to the deposition of carbon, require that the carbon be completely removed with the minimum amount of exposure to temperature and the oxidizing stream. The method of determining when oxygen appears in the stream after passing over the spent catalyst by determining the possible oxygen content of samples is time-consuming and involves considerable delay between the time when the first oxygen appears and the time when the oxygen source is removed. The present invention furnishes a simple and quick responding means for regulating and controlling such type processes.

The means for detecting and controlling chemical reactions according to the invention may be any form of radiant energy, but preferably is that of light and the use of photosensitive equipment to detect the variation in amount and intensity of a light beam before and after passing through the reaction system or the particular material under investigation. Thus the invention may be applied to the detection of oxygen in a gaseous stream by reason of colorations produced in certain type solutions when they become oxidized and the subsequent passing through such solutions of a light beam. Application may also be made to the passing of light through various colored solutions due to the change in hydrogen ion concentration in the presence of suitable indicators.

The invention can be specifically illustrated by a device adapted to indicate the oxidation of a liquid such as pyrogallol which is substantially colorless in the unoxidized condition, but markedly discolored when oxidized. When light is transmitted through solutions unaffected by oxygen and light from the same source also passed through a solution affected by oxygen, and the respective beams allowed to affect photo-sensitive equipment such as a photo-electric cell or a selenium resistance, the variations in coloration may thus be translated into electrical energy and subsequently to a convenient means of visible recording or activation of valve controls. Usually a comparison is made of the light intensities of the solutions in the unoxidized and oxidized conditions and arrangement made so that the effects can be counterbalanced. Suitable means are then provided for recording the extent to which the potentials are thrown out of bounds by the variation in amount which different intensities of the light directed to the light-sensitive devices cause.

The accompanying drawing presents a diagrammatic representation of a completed device for detecting the presence of oxygen in the exit stream from the catalyst regeneration system involving the removal of carbon from the surface of the catalyst. In the drawing, an electric lamp 1 is shown as a source of light for examining portions 2 and 3 of the processing equipment. A system is arranged by which a pyrogallol solution of the following composition:

| | Grams |
|---|---|
| KOH | 300 |
| $C_6H_6O_3$ | 33 | or

| | |
|---|---|
| NaOH | 215 |
| $C_6H_6O_3$ | 33 |
| $H_2O$ to make 1000 cc. | | flows down past reservoir 2 and then is continuously dropped in a stream of the exit gas from the catalyst regeneration system (not shown) and passed through the tube or zone 4, a portion of which is inclined to the vertical. The portion 3 of the apparatus is a tube where the pyrogallol solution and gas come into contact with each other in a small cup or recess 3 in the lower wall of the inclined tube 4 in which the pyrogallol solution is held up for a short time and is thereby contacted with more gas than would be possible by just passing through the tube with the gas. A conduit 10 for the gas stream from the reactor outlet, not shown, opens into the reaction tube 4 above the inclined portion and is adapted to deliver the gas in a stream into the reaction tube 4. A branch 11 leads from the conduit 10 into the reservoir to above the normal level of indicator liquid therein. A chamber 12 is provided into which the lower portion of the reaction tube 4 below the recess 3 extends. The chamber 12 functions as a common discharge for the concurrently flowing gas stream and indicator liquid. The reaction tube 4 opens below the normal level 13 of indicator liquid in the chamber 12. A conduit 14 leads from the chamber 12 above the normal level of indicator liquid and discharges into a gas meter not shown. After passing through portions of the reservoir 2 and recess 3 the light beams are intercepted by photo-sensitive equipment such as a photo-electric cell. Any darkening in color of the pyrogallol solution due to the presence of oxygen in the gas will influence the photo-electric cell. The two cells 5 and 6, affected respectively by the beams passing from portions of the apparatus 2 and 3, are mutually wired so as to exert a counterbalancing effect one upon the other. When the light absorptive conditions of the solutions at 2 and 3 are unequal, the cells 5 and 6 will be affected unequally. If more light passes through the vessel 2 than through vessel 3 the cell 5 will be more active than the cell 6, and thus generate more electricity. This difference in electrical energy may be amplified so as to effect a relay system which in turn activates a system for opening and closing the valve according to the detection or absence of oxygen in portion 3 of the equipment.

What is claimed is:

Apparatus for detecting and controlling the supply of a gas in a gas stream by means of an indicator liquid which changes color in the presence of the gas, which comprises a reservoir adapted to contain the indicator liquid and having a transparent portion, a reaction tube a transparent portion of the side walls of which is inclined to the vertical, the reservoir having a discharge portion opening into the upper portion of the reaction tube, a valve in the discharge portion whereby indicator liquid may be flowed continuously into the tube and against the inner surface of its sidewalls, a conduit for the gas stream opening into the reaction tube above the inclined portion and adapted to deliver the gas in a stream into the reaction tube, the interior lower wall of the inclined portion of the tube having a recess adapted to accumulate the indicator liquid during its passage down the sidewall of the tube in contact with the gas stream whereby presence of the gas in the gas stream causes the indicator liquid to change color, a chamber into which the lower portion of the reaction tube below the recess extends, the chamber being adapted to function as a common discharge for the concurrently flowing gas stream and indicator liquid, the reaction tube opening into the lower portion of the chamber, a conduit leading from the upper portion of the chamber and discharging into a gas meter, a source of light and two photoelectric cells so positioned adjacent the reservoir and recess that a beam of light will pass through the transparent portion of the reservoir and another beam of light will pass through the recess, each beam then passing to one of the photo-electric cells, and means connected with and operated by the cells to control the supply of gas.

ELTON R. LEWIS.

REFERENCES CITED

The following references are of record in the file of this patent:

UNITED STATES PATENTS

| Number | Name | Date |
| --- | --- | --- |
| 1,905,251 | Styer | Apr. 25, 1933 |
| 1,977,359 | Styer | Oct. 16, 1934 |
| 1,919,858 | Pettingill | July 25, 1933 |
| 2,019,871 | Pettingill et al. | Nov. 5, 1935 |
| 2,036,251 | Boyton | Apr. 7, 1936 |
| 2,286,985 | Hanson | June 16, 1942 |
| 2,389,046 | Hare | Nov. 13, 1945 |

FOREIGN PATENTS

| Number | Country | Date |
| --- | --- | --- |
| 359,848 | German | Sept. 27, 1922 |
| 309,733 | German | Dec. 11, 1918 |